(12) United States Patent
Tsuzuki et al.

(10) Patent No.: US 7,929,201 B2
(45) Date of Patent: Apr. 19, 2011

(54) MULTISTAGE OPTICAL AMPLIFIER WITH GAIN CONTROL USING PUMP RATIO

(75) Inventors: Tatsuya Tsuzuki, Kawasaki (JP); Norifumi Shukunami, Kawasaki (JP); Yuji Tamura, Kawasaki (JP); Yoshio Shimano, Kawasaki (JP); Masao Nakata, Kawasaki (JP); Takashi Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 12/213,565

(22) Filed: Jun. 20, 2008

(65) Prior Publication Data
US 2008/0316591 A1  Dec. 25, 2008

(30) Foreign Application Priority Data

Jun. 21, 2007  (JP) ................................. 2007-163391

(51) Int. Cl.
*H04B 10/17* (2006.01)
*H04B 10/12* (2006.01)

(52) U.S. Cl. .............. 359/341.41; 359/337.4; 359/341.3

(58) Field of Classification Search ............... 359/337.4, 359/341.3, 341.41
See application file for complete search history.

(56) References Cited

U.S. PATENT DOCUMENTS

| | | | |
|---|---|---|---|
| 5,818,629 A | 10/1998 | Kinoshita | |
| 5,991,069 A | 11/1999 | Jander | |
| 6,055,092 A | 4/2000 | Sugaya et al. | |
| 6,426,833 B1 * | 7/2002 | Bao | 359/341.32 |
| 6,483,632 B1 * | 11/2002 | Jolley et al. | 359/337.4 |
| 6,496,302 B1 | 12/2002 | Michishita | |
| 6,603,596 B2 * | 8/2003 | Inagaki et al. | 359/341.4 |
| 6,765,659 B1 * | 7/2004 | Bhatnagar et al. | 356/73.1 |
| 7,061,669 B2 | 6/2006 | Nakashima et al. | |
| 7,079,312 B2 * | 7/2006 | Koch et al. | 359/341.3 |
| 7,085,043 B2 * | 8/2006 | Takeyama et al. | 359/337.1 |
| 2002/0171917 A1 * | 11/2002 | Lelic et al. | 359/341.4 |
| 2002/0186460 A1 * | 12/2002 | Lelic | 359/341.4 |
| 2006/0146398 A1 * | 7/2006 | Aozasa et al. | 359/341.1 |

FOREIGN PATENT DOCUMENTS

EP    0 902 567    3/1999

(Continued)

OTHER PUBLICATIONS

Extended European Search Report issued Oct. 7, 2008 in corresponding European Patent Application No. 08011071.1.

*Primary Examiner* — Eric Bolda
(74) *Attorney, Agent, or Firm* — Staas & Halsey LLP

(57) ABSTRACT

According to an aspect of the embodiment of the invention, an optical amplifier including an input port, an output port, a plurality of amplifying parts, an optical attenuator, a gain controller and an optical attenuator controller. The plurality of amplifying parts includes an optical amplification medium and a pumping light source for generating pump light. The optical attenuator is optically connected between the amplifying parts. The gain controller controls the pump light power of the pump sources, respectively, in such a way that the ratio decreases in accordance with the gain set value increasing and the ratio interpose between a first threshold level and a second threshold level. The optical attenuator controller controls attenuation of the optical attenuator in order to maintain the sum of generating gains of the amplifying parts in the gain set value in accordance with a state of the signal light inputted into the input port.

7 Claims, 12 Drawing Sheets

FOREIGN PATENT DOCUMENTS

| | | |
|---|---|---|
| EP | 1 376 904 | 1/2004 |
| EP | 1 788 732 | 5/2007 |
| JP | 8-248455 | 9/1996 |
| JP | 11-266063 | 9/1999 |
| JP | 2000-91676 | 3/2000 |
| WO | 98/36513 | 8/1998 |
| WO | 03/084007 A1 | 10/2003 |

\* cited by examiner

MULTISTAGE OPTICAL AMPLIFIER WITH GAIN CONTROL USING PUMP RATIO

CROSS-REFERENCE TO RELATED APPLICATION

This application is based upon and claims the benefit of priority of the prior Japanese Patent Application No. 2007-163391, filed on Jun. 21, 2007, the entire contents of which are incorporated herein by reference.

BACKGROUND

1. Field

The present invention relates to an optical amplifier for use in a Wavelength Division Multiplexing (WDM) optical transmission system.

2. Description of the Related Art

With the wide spread of the Internet, image transmission services and so on, the amount of information to be transmitted over a network increases rapidly, and in order to support this, the introduction of a WDM optical transmission system has been underway. The WDM optical transmission system is started to adopt from long-distance trunk line systems and has also come to be adopted to a metropolitan ring network as a WDM optical transmission system having a wavelength routing function.

The optical amplifier for use in the WDM optical transmission system as described above is required in performance or characteristic to satisfy the requirements:
(a) To have a gain adjustable function in order to compensate a variety of optical losses;
(b) To prevent wavelength dependence of the gain and to prevent wavelength dependence of the gain even when the gain changes in order to transmit all optical signals contained in WDM light in a same manner; and
(c) To keep the gain caused by an optical amplifying catalyst since the gain wavelength characteristic changes if the gain caused by the optical amplifying catalyst is changed based on the amplification principle in an optical amplifier having an Erbium Doped Fiber (EDF), for example, as the optical amplifying catalyst.

FIG. 12 is a block diagram showing an example of a conventional optical amplifier configured to satisfy the requirements (a) to (c). In the conventional configuration example, the optical amplifier having the gain adjustable function is implemented by a combination of a fixed gain control section and an adjustable automatic optical loss control. More specifically, a variable optical Attenuator (VOA) 130 is deployed between the stages of the optical amplifying sections in the two-stage configuration having EDFs 101 and 102. The generated gain in the EDF 101 in the former stage is controlled by the gain control section 121 to be constant at a fixed target value, and the optical loss in the VOA 130 is controlled by the optical loss control section 140 to be constant at a variable target value. Furthermore, the generated gain in the EDF 102 in the latter stage is controlled by the gain control section 122 to be constant at a fixed target value. Thus, the gain variable optical amplifier satisfying the requirements (a) to (c) can be provided (refer to Japanese Laid-open Patent Publication No. 8-248455, for example).

The frequency of change of the number of wavelength of WDM light in the WDM optical transmission system having the wavelength routing function, like one having been adopted to metropolitan ring networks, is higher than that in a long distance trunk line system. When the number of wavelengths of WDM light is changed, the input strength of signal light of the optical amplifier changes. Also in this case, the characteristic that the generated gain in the optical amplifying catalyst does not change is required as the optical amplifier. In other words, the high speed characteristic for the automatic gain control by the optical amplifier (that is, the followability upon change of light input strength) is required.

In conventional optical amplifiers as shown in FIG. 12, an increase in speed of the automatic gain control in the entire optical amplifier including the optical loss in the VOA 130 is attempted by controlling pump light sources 111 and 112 by keeping the constant ratio ($Pp_1/Pp_2$) of the strengths $Pp_1$ and $Pp_2$ of pump light $P_1$ and $P_2$ to be supplied to the EDFs 101 and 102 in the stages independent of the change in gain set value of the entire optical amplifier. From the viewpoint of the high speed characteristic of the automatic gain control, providing a common gain control section 120 to the EDFs 101 and 102 as shown in FIG. 13, for example, is more advantageous than providing gain control sections 121 and 122 correspondingly and separately to the EDFs 101 and 102.

By the way, the conventional optical amplifier as described above must keep the generated gain in the EDFs 101 and 102 within a proper range for the reasons below:

(I) The optical transmission characteristic is adversely effected by a Noise Figure (NF) of the entire optical amplifier increased by an excessively small gain generated in the EDF 101 in the first stage; and (II) The optical transmission characteristic of signal light is adversely effected by the crosstalk (MPS-XT) between light $S_{OUT}$, which has passed through the EDF once, and light $XT_{OUT}$, which has passed through the EDF multiple times, since the Multi Pass Interference (MPI) caused within the optical amplifier is increased by an excessively large gain generated in the EDF 101 in the first stage, as shown in the conceptual diagram in FIG. 14.

However, in the conventional configuration, which is advantageous for increases in speed of the automatic gain control as shown in FIG. 13, the generated gains in the EDFs 101 and 102 are not directly monitored, and the automatic gain control over the entire optical amplifier is performed by assuming the constant ratio ($P_{p1}/P_2$) of the pump light strengths of the EDFs. Thus, the generated gains in the EDFs 101 and 102 change when the gain set value for the entire optical amplifier change. Therefore, it is difficult to keep the generated gains in the EDFs 101 and 102 within a proper range, which has adverse effect on the transmission characteristic of the amplified signal light.

Here, the reasons (I) and (II) will be described in more details. First of all, for the configuration example in FIG. 13, parameters are defined as follows.

$P_{SIN}$: Signal light input strength of an optical amplifier
$NF_{AMP}$: Noise figure of an entire optical amplifier
$MPI_{AMP}$: Amount of multi pass interference (MPI) occurring within an optical amplifier
$P_{S1}$ and $P_{S2}$: Signal light input strengths of the EDFs in the first and second stages
$P_{p1}$ and $P_{p2}$: Output strengths of the pump light sources in the first and second stages
$G_1$ and $G_2$: Generated gains of the EDFs in the first and second stages
$NF_1$ and $NF_2$: Noise figures of the EDFs in the first and second stages
$Rb_1$ and $Rb_2$: Return losses on the upstream sides of the EDFs in the first and second stages
$Rf_1$ and $Rf_2$: Return losses on the downstream sides of the EDFs in the first and second stages
$L_{12}$: Optical Loss between the EDFs in the first and second stages Generally, the noise figure $NF_{AMP}$ of an optical amplifier is expressed by:

$$NF_{AMP} = (NF_1/P_{S1} + NF_2/P_{S2}) \times P_{SIN} \quad [EQ1]$$

The signal input strength $P_{S1}$ of the EDF in the first stage and the signal light input strength $P_{S2}$ of the EDF in the second stage have the following relationship:

$$P_{S2} = P_{S1} \times G_1/L_{12} \quad [EQ2]$$

The EQ1 and EQ2 above describe that, as the generated gains $G_1$ in the EDF in the first stage decreases, the signal light input strength $P_{S2}$ of the EDF in the second stage decreases, and the noise figure $NF_{AMP}$ of the entire optical amplifier increases.

The amount of occurrence of multi pass interference $MPI_{AMP}$ within the optical amplifier as shown in FIG. 14 is dominant on the signal optical path near the EDF and can be expressed by:

$$MPI_{AMP} = G_1^2/(Rb_1 \times Rf_1) + G_2^2/(Rb_1 \times Rf_1) \quad [EQ3]$$

The EQ3 describes that, as the generated gain $G_1$ in the EDF in the first stage increases, the amount of occurrence of the multi pass interference $MPI_{AMP}$ within the optical amplifier increases.

FIGS. 15 to 17 are examples of the specific comparison between a case where the ratio $(Pp_1/Pp_2)$ of the pump light strength of each EDF is set high and a case where it is set low based on the descriptions above. Notably, the symbol $G_{SET}$ in the figures indicates the gain set value for the entire optical amplifier.

As shown in FIG. 15, in a case where the ratio $(P_{p1}/P_{p2})$ of the pump light strength is set high, the gain $G_1$ of the EDF in the first stage increases as high as 25 dB by setting a relatively high value such as 30 dB as the gain set value $G_{SET}$ for the entire optical amplifier. This state corresponds to the area a having a high gain set value $G_{SET}$ on the horizontal axis in the relationship indicated by the solid line A in FIG. 17 and is the state relating to the reason (II), which is beyond the upper limit level (broken line) of the permissible range of MPI-XT. The top part of FIG. 17 shows the relationship of the ratio $(P_{p1}/P_{p2})$ of the pump light strengths about the gain set value $G_{SET}$, and the bottom part of FIG. 17 shows the relationship of the generated gain $G_1$ in the EDF in the first stage with the gain set value $G_{SET}$.

As shown in FIG. 16, in a case where the ratio $(P_{p1}/P_{p2})$ of the pump light strength is set relatively low, the signal light input strength $P_{S2}$ to the EDF in the second stage decreases as low as −20 dB by setting a relatively low value such as 15 dB as the gain set value $G_{SET}$ for the entire optical amplifier. This state corresponds to the area b having a low gain set value $G_{SET}$ on the horizontal axis in the relationship indicated by the solid line B in FIG. 17 and is the state relating to the reason (I), which is below the lower limit level (long dashed short dashed line) of the permissible range of NF deterioration.

Regarding the suppression of MPI-XT in an optical amplifier as described above, the International Publication Pamphlet No. 03/084007, for example, discloses the return loss on the output side is decreased according to the amount of attenuation of the interstage VOA, which can improve the MPI-XT. However, the conventional technology does not consider the relationship between the ratio (generated gain in the optical amplifying catalyst in each stage) given to the optical amplifying catalyst in each stage and the MPI-XT or NF deterioration, and it is difficult to solve the problem of keeping the generated gain in each EDF within a proper range, as described above.

SUMMARY

Accordingly, it is an object of the embodiment of the present invention to provide an optical amplifier that performs automatic gain control collectively over optical amplifying sections in a multistage configuration.

According to an aspect of the embodiment of the invention, an optical amplifier including an input port, an output port, a plurality of amplifying parts, an optical attenuator, a gain controller and an optical attenuator controller. The plurality of amplifying parts includes an optical amplification medium and a pumping light source for generating pump light. The optical attenuator is optically connected between the amplifying parts. The gain controller controls the pump light power of the pump sources, respectively, in such a way that the ratio decreases in accordance with the gain set value increasing and the ratio interpose between a first threshold level and a second threshold level. The optical attenuator controller controls attenuation of the optical attenuator in order to maintain the sum of generating gains of the amplifying parts in the gain set value in accordance with a state of the signal light inputted into the input port.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTIONS OF THE PREFERRED EMBODIMENT

Figure 1:
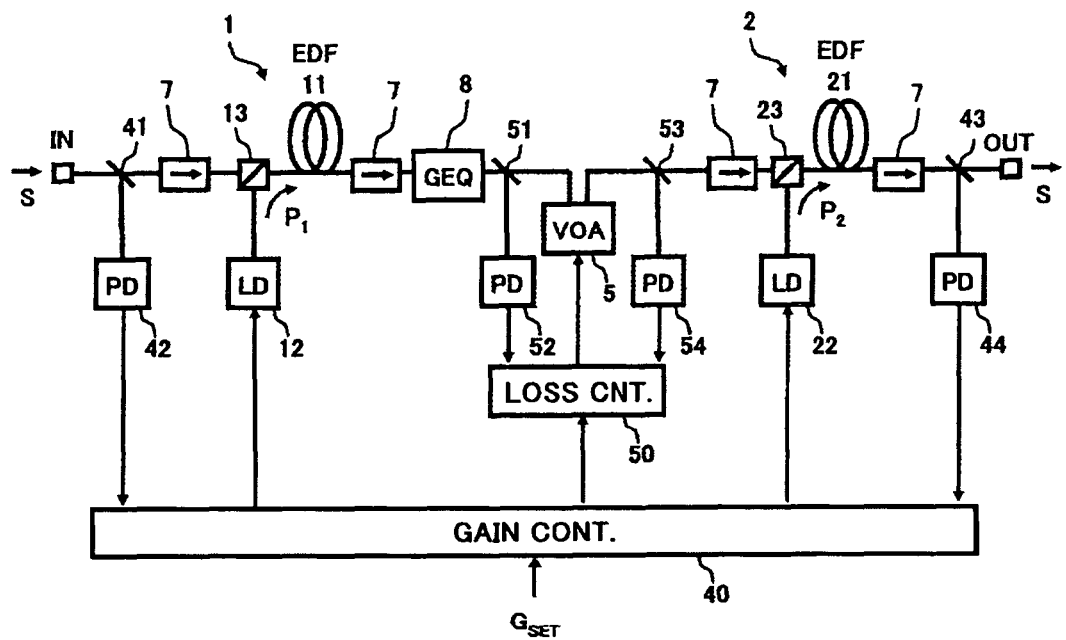
FIG. 1 is a block diagram showing a configuration of the optical amplifier according to a first embodiment of the present invention.

With reference to the attached drawings, the best mode for carrying out the invention will be described. The same reference numerals are given to the same or corresponding parts in all of the drawings.

FIG. 1 is a block diagram showing a configuration of an optical amplifier according to a first embodiment of the invention.

In FIG. 1, an optical amplifier of this embodiment includes optical amplifying sections 1 and 2 in two stages directly connected between an optical input port IN and an optical output port OUT and a variable optical attenuator (VOA) 5 placed on the optical path between the optical amplifiers 1 and 2. In order to keep a constant gain by the entire optical amplifier including the amount of attenuation by the variable optical attenuator 5 at the externally instructed gain set value $G_{SET}$, the optical amplifier further includes a gain control section 40 and an optical loss control section 50. The gain control section 40 controls the optical amplifying sections 1 and 2 by changing the ratio of the pump light strengths in the optical amplifying sections 1 and 2 according to the gain set value $G_{SET}$. The optical loss control section 50 controls the variable optical attenuator 5 such that the optical loss in the variable optical attenuator 5 can be constant at the target value corresponding to the gain set value $G_{SET}$.

Furthermore, optical isolators 7 are placed among the optical input port IN, the optical amplifying section 1 in the first stage, the variable optical attenuator 5, the optical amplifying section 2 in the second stage and the optical output port OUT. A gain equalizer (GEQ) 8 is provided between the optical amplifying section 1 in the first stage and the variable optical attenuator 5 for equalizing the wavelength dependence of the gains in the optical amplifying sections 1 and 2. The optical isolators 7 and the gain equalizer 8 may be provided properly as required and may be omitted.

The optical amplifying sections 1 and 2 in the first and second stages have Erbium Doped Fibers (EDFs) 11 and 21, pump light sources (LDs) 12 and 22 and WDM couplers 13 and 23, respectively, and have a configuration in which the pump light P1 and P2 output from the pump light sources 12 and 22 are synthesized with signal light S by the WDS couplers 13 and 23 and are supplied to the EDFs 11 and 21. The strengths $P_{p1}$ and $P_{p2}$ of the pump light $P_1$ and $P_2$ output from the pump light sources 12 and 22 are variably controlled according to the control signal supplied from the gain control section 40 to the pump light sources 12 and 22.

Having described the example having EDFs as the optical amplifying catalysts, a rare-earth doped optical fiber excluding Erbium may be used as the optical amplifying catalysts. The present invention is effective for an optical amplifier having an optical amplifying catalyst having an amplification characteristic that the wavelength characteristic changes when the gain setting is changed. Having described the front-excited configuration example in which signal light and pump light are given to the EDFs in the same direction, the present invention is not limited thereto. The present invention is also applicable to the rear-excited configuration in which signal light and pump light are given to the EDFs in the opposite directions or the bidirectional excited configuration combining the front excited and the rear excited configurations.

The gain control section 40 receives the information on the gain set value $G_{SET}$ through an external interface section, not shown. Furthermore, the gain control section 40 receives the result of monitoring the strength $P_{SIN}$ of the signal light S input from the optical input port IN to the optical amplifying section 1 in the first stage by using an optical coupler 41 on the optical path between the optical input port IN and the WDM coupler 13 and a photodetector (PD) 42 connecting to the tap port of the optical coupler 41 and the result of monitoring the strength $P_{SOUT}$ of the signal light S output from the optical amplifying section 2 in the second stage to the optical output port OUT by using an optical coupler 43 on the optical path between EDF 21 and the optical output port OUT and a photodetector (PD) 44 connecting to the tap port of the optical coupler 43. The gain control section 40, as will be described in detail later, determines the ratio ($P_{p1}/P_{p2}$) between the strength $P_{p1}$ of the pump light $P_1$ output from the pump light source 12 of the optical amplifying section 1 in the first stage and the strength $P_{p2}$ of the pump light $P_2$ output from the pump light source 22 of the optical amplifying section 2 in the second stage according to the externally instructed gain set value $G_{SET}$ and controls the output strengths $P_{p1}$ and $P_{p2}$ of the pump light sources 12 and 22 according to the ratio ($P_{p1}/P_{p2}$) such that the gain $G_{AMP}$ of the entire optical amplifier, which is calculated by using the monitor values of the signal light input strength $P_{SIN}$ and the signal light output strength $P_{SOUT}$, can be constant at the gain set value $G_{SET}$.

The variable optical attenuator 5 receives the input of the signal light S, which has been amplified by the EDF 11 in the first stage and has passed through the optical isolators 7 and the gain equalizer 8, gives a loss to the signal light S according to the variable amount of attenuation which is controlled by the optical loss control section 50 and outputs the signal light S to the EDF 21 in the second stage through the optical isolators 7 and the WDM coupler 23.

The optical loss control section 50 receives the gain set value $G_{SET}$ through the gain control section 40. Furthermore, the optical loss control section 50 receives the result of monitoring the strength of the signal light S to be input to the variable optical attenuator 5 by using an optical coupler 51 at the input end of the variable optical attenuator 5 and a photodetector (PD) 52 connecting to the tap port of the optical coupler 51 and the result of monitoring the strength of the signal light S output from the variable attenuator 5 by using an optical coupler 53 at the output end f the variable optical attenuator 5 and a photodetector (PD) 54 connecting to the tap port of the optical coupler 53. The optical loss control section 50 determines the target value of the optical loss in the variable optical attenuator 5 according to the gain set value $G_{SET}$ and controls the amount of attenuation by the variable optical attenuator 5 such that the optical loss in the variable optical attenuator 5, which is calculated by using the monitor values of the signal light strengths output from the photodetectors 52 and 54, can be constant at the target value.

Having described here the configuration example in which the strengths of the signal light input/output to/from the variable optical attenuator 5 are monitored to control the optical loss in the variable optical attenuator 5, the optical couplers 51 and 53 and the photodetectors 52 and 54 may be omitted, and the amount of attenuation in the variable optical attenuator 5 may be directly controlled to a predetermined value corresponding to the target value of the optical loss.

Next, operations of the first embodiment will be described.

In the optical amplifier in the configuration above, the generated gains in the EDFs 11 and 21 in the optical amplifying sections 1 and 2 can be kept within a proper range even when the gain set value $G_{SET}$ changes by changing the ratio ($P_{p1}/P_{p2}$) of the strengths of the pump light $P_1$ and $P_2$ output from the pump light sources 12 and 22 of the optical amplifying sections 1 and 2 in the first and second stages according to the gain set value $G_{SET}$, more specifically, by decreasing the ratio ($P_{p1}/P_{p2}$) of the pump light strengths as the gain set value $G_{SET}$ increases.

Figure 2:
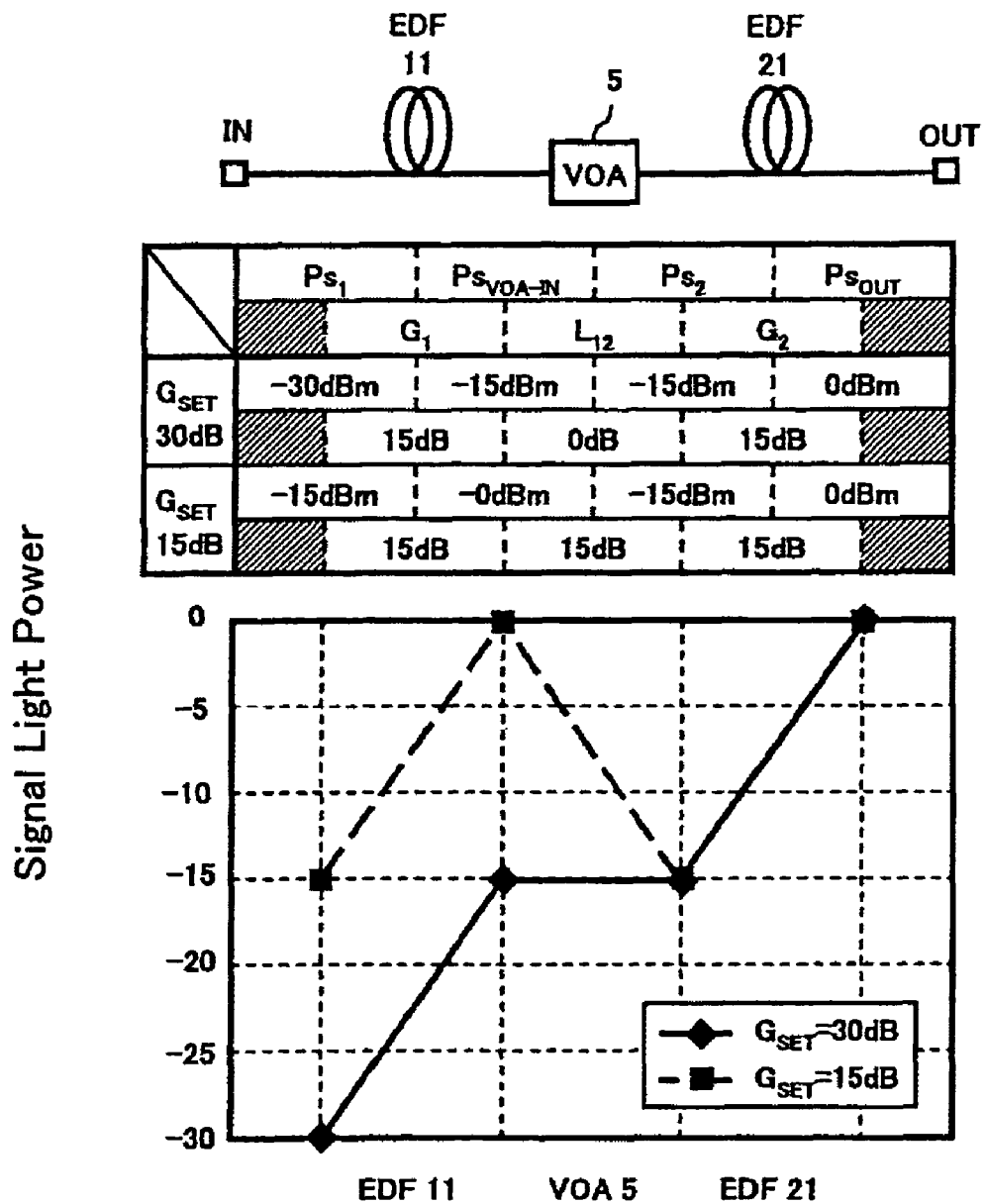
FIG. 2 is a diagram showing an example of the level diagram corresponding to different gain set values according to the first embodiment.

FIG. 2 is an example of the level diagram corresponding to different gain set values $G_{SET}$ (where 30 dB and 15 dB are assumed) for the optical amplifier of the first embodiment. As illustrated in this example, the generated gains $G_1$ and $G_2$ in the EDFs 11 and 21 are kept constant (at 15 dB here) independent of the change in gain set value $G_{SET}$ in the optical amplifier, and the change in gain set value $G_{SET}$ is compensated by changing the optical loss $L_{12}$ in the variable optical attenuator 5.

Here, the requirements for keeping constant generated gains $G_1$ and $G_2$ in the EDFs 11 and 21 will be described in detail based on the basic amplification characteristic.

Figure 3:
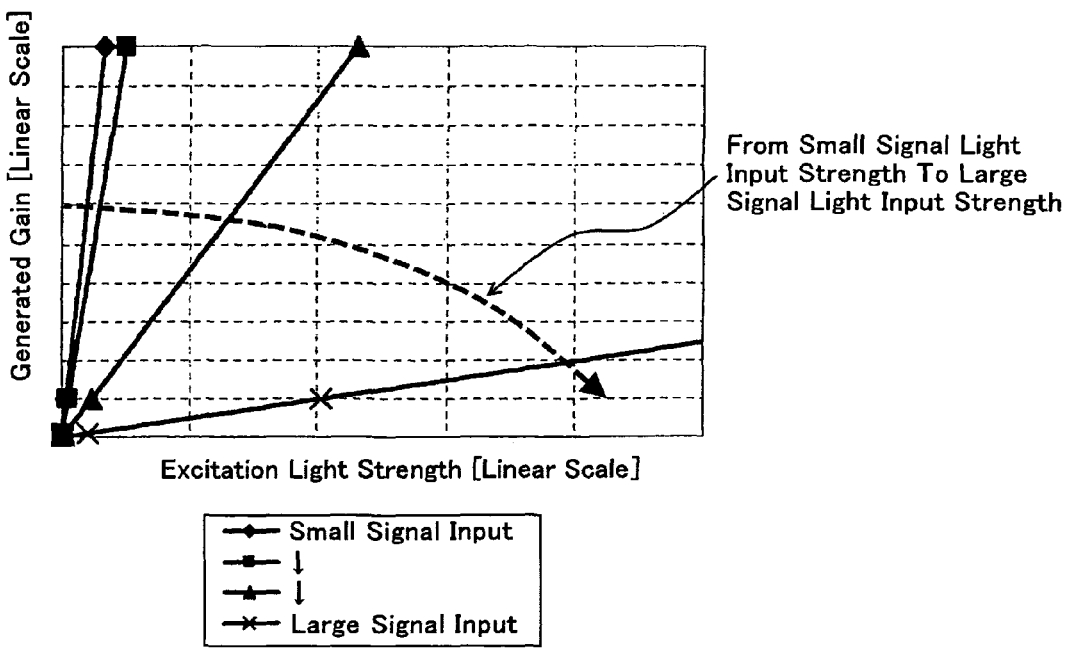
FIG. 3 is a diagram showing a basic amplification characteristic of an EDF.
Figure 3:
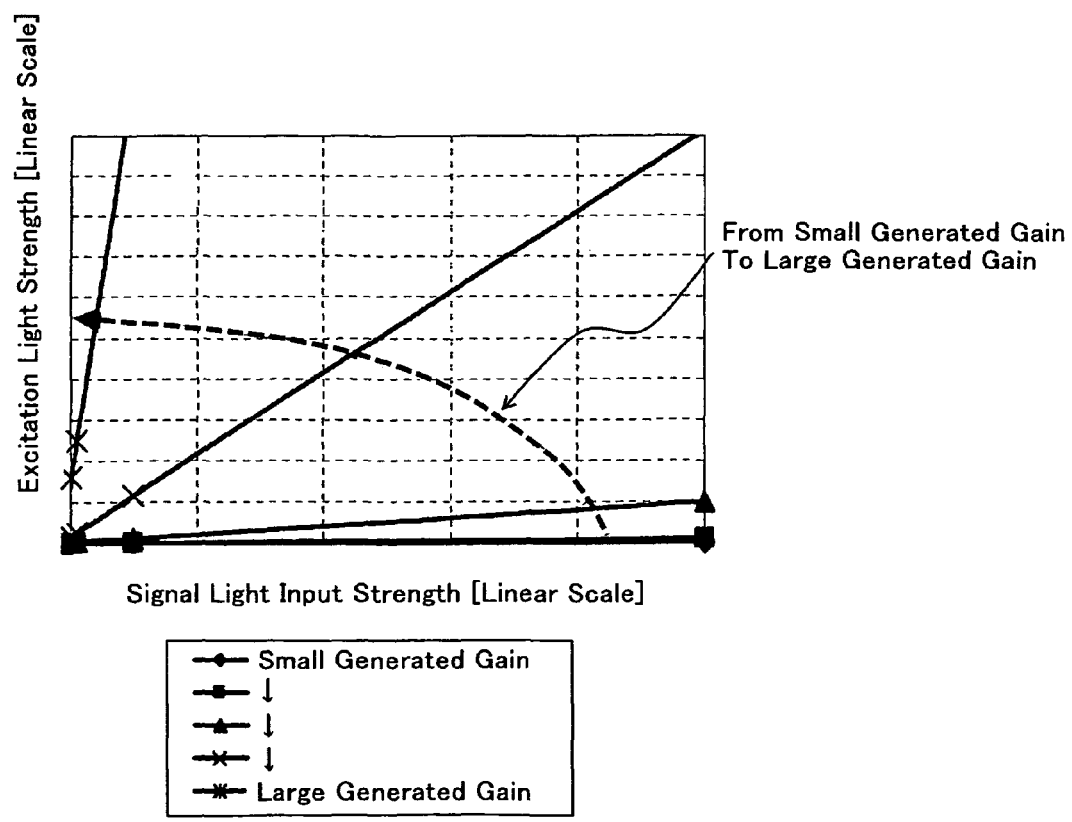

It is known that linearity as shown in FIG. 3 exists as the basic amplification characteristic among the signal light input strength, pump light strength and generated gain of an EDF. By focusing on the linearity of the EDF amplification characteristic, the requirements in the signal light input strengths $P_{s1}$ and $P_{s2}$ and pump light strengths $P_{p1}$ and $P_{p2}$ for keeping constant generated gains $G_1$ and $G_2$ in the EDFs 11 and 21 may be expressed by:

$$P_{p1}=a_1 \times P_{s1}+b_1 \quad [EQ4]; \text{ and}$$

$$P_{p2}=a_2 \times P_{s2}+b_2 \quad [EQ5]$$

where $a_1$, $a_2$, $b_1$ and $b_2$ are proportionality constants and fixed values.

The relationship EQ2 is satisfied between the signal light input strength $P_{s1}$ of the EDF 11 in the first stage and the signal light input strength $P_{s2}$ of the EDF 21 in the second stage, and a variation thereof is:

$$P_{s1}/P_{s2}=L_{12}/G_1 \quad [EQ6]$$

Furthermore, the optical loss $L_{12}$ between the EDFs in the first and second stages can be expressed by:

$$L_{12}=G_{MAX}/G_{SET} \quad [EQ7]$$

where $G_{MAX}$ is the maximum value of the gain set value $G_{SET}$.

By organizing the EQ4 to EQ7, the relationship between the output strength $P_{p1}$ of the pump light source 12 in the first stage and the output strength $P_{p2}$ of the pump light source 22 in the second stage can be described by:

$$(P_{p1}-b_1)/(P_{p2}-b_2)=a/G_{SET} \quad [EQ8]$$

where a is a constant, and $a=(a_1/a_2) \times (G_{MAX}/G_1)$

Therefore, by setting the constants a, $b_1$ and $b_2$ in the EQ8 properly in consideration of the permissible ranges of MPI-XT and NF deterioration based on the optical circuit configuration and/or the amplification characteristics of EDFs of an optical amplifier, the ratio ($P_{p1}/P_{p2}$) of the pump light strengths corresponding to the gain set value $G_{SET}$ of the entire optical amplifier can be calculated according to the relationship in the EQ8. For example, the permissible upper range of the MPI-XT is decided by a permissible bit error ratio in transmission line for communicating. For example, the permissible lower range of the NF deterioration is decided by a permissible bit error ratio in transmission line for communicating.

Figure 4:
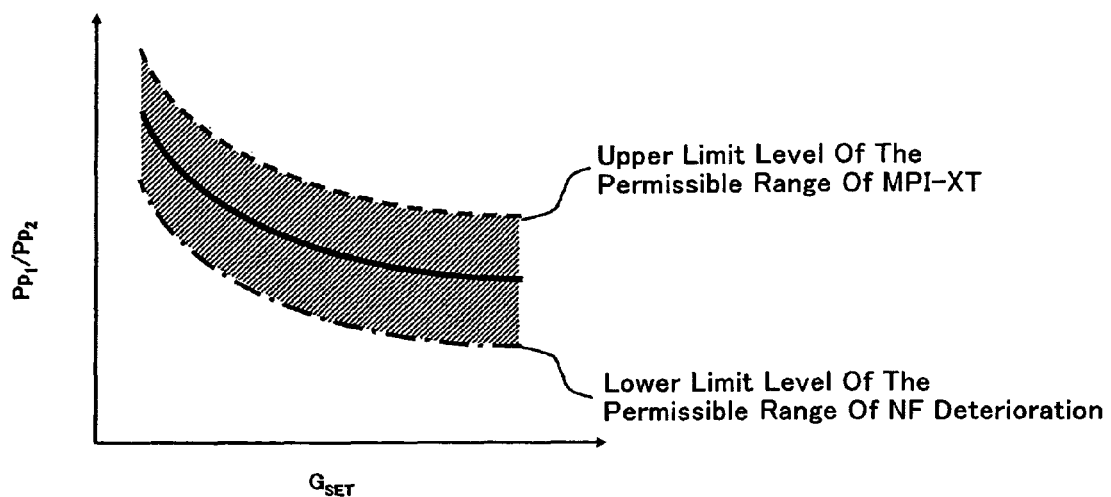
FIG. 4 is a diagram showing an example of the relationship between the ratio of pump light strengths and a gain set value according to the first embodiment.
Figure 5:
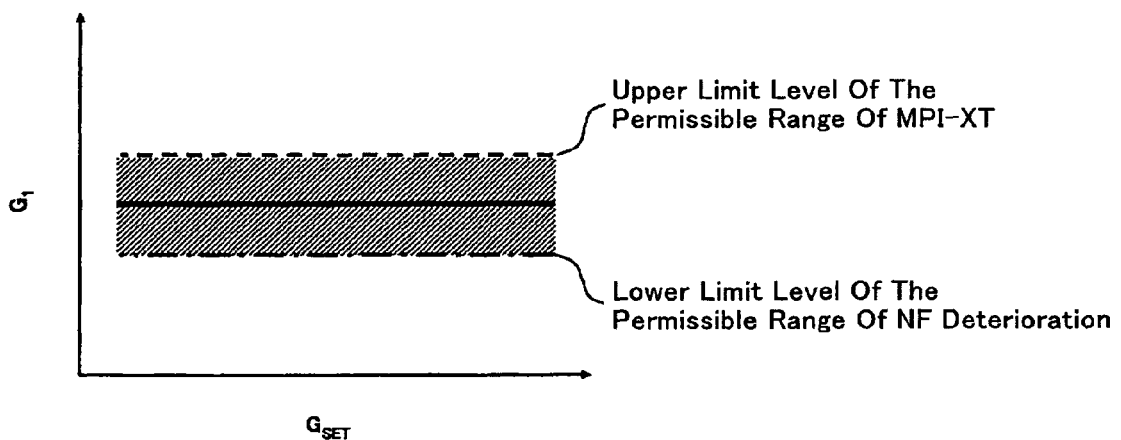
FIG. 5 is a diagram showing an example of the relationship between the generated gain in the EDF in the first stage and a gain set value according to the first embodiment.

FIG. 4 shows an example of the relationship between the ratio ($P_{p1}/P_{p2}$) of the pump light strengths and the gain set value $G_{SET}$ in the optical amplifier of the first embodiment. FIG. 5 shows an example of the relationship between the generated gain $G_1$ in the EDF 11 in the first stage and the gain set value $G_{SET}$ in the optical amplifier of the first embodiment.

As shown in FIG. 4, the ratio ($P_{p1}/P_{p2}$) of the pump light strengths decreases as the gain set value $G_{SET}$ increases according to the relationship in the EQ8 and is set equal to or lower than the upper limit level (which is a first threshold value indicated by the broken line) of the permissible range of MPI-XT and equal to or higher than the lower limit level (which is a second threshold value indicated by the long dashed short dashed line) of the permissible range of NF deterioration. In this way, by performing automatic gain control over the entire optical amplifier by the gain control section 40 based on the ratio ($P_{p1}/P_{p2}$) of the pump light strengths, which is optimized based on the gain set value $G_{SET}$, the generated gain $G_1$ in the EDF 11 in the first stage can be constant within the permissible range of MPI-XT and NF deterioration (shaded parts) independent of the change in gain set value $G_{SET}$, as shown in FIG. 5. Since the change in gain set value $G_{SET}$ is compensated by the control over the optical loss $L_{12}$ in the variable optical attenuator 5, the generated gain $G_2$ in the EDF 21 in the second stage can also be constant within the permissible ranges of MPI-XT and NF deterioration, independent of the change in gain set value $G_{SET}$.

Therefore, in the optical amplifier of the first embodiment, the automatic gain control can be quickly performed over the entire optical amplifier, keeping the generated gains $G_1$ and $G_2$ in the EDFs 11 and 21 within a proper range even when the gain set value $G_{SET}$ changes, and the adverse effect to the optical transmission characteristic due to MPI-XT and/or NF deterioration can be avoided.

Figure 6:
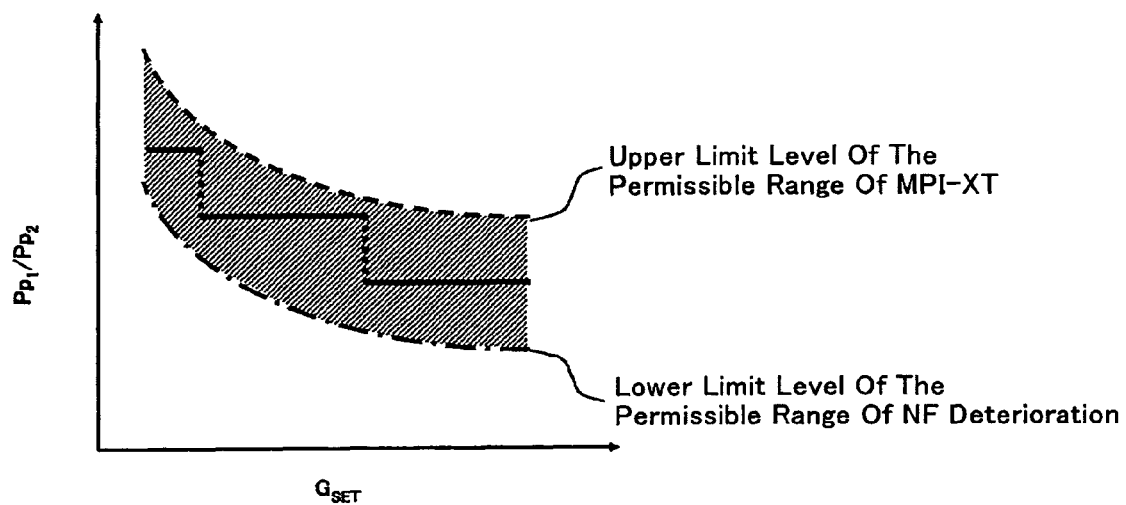
FIG. 6 is a diagram showing another example of the relationship between the ratio of pump light strengths and a gain set value, which relates to the first embodiment.
Figure 7:
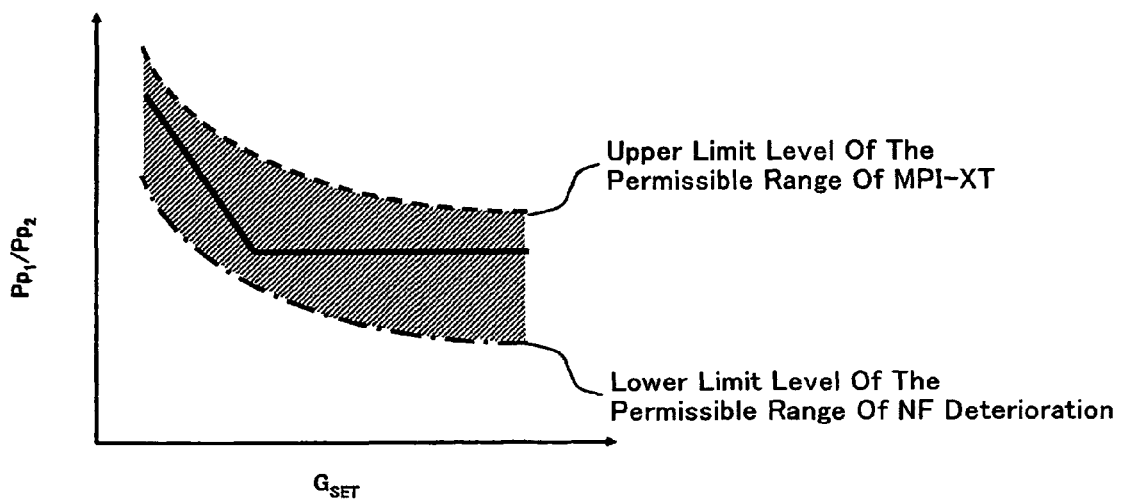
FIG. 7 is a diagram showing another example of the relationship between the ratio of pump light strengths and a gain set value, which relates to the first embodiment.

Notably, having described the first embodiment in which the ratio ($P_{p1}/P_{p2}$) of pump light strengths decreases continuously as the gain set value $G_{SET}$ increases based on the relationship in EQ8 (FIG. 4), the variable range of the gain set value $G_{SET}$ may be divided into multiple (three here) sections, and the ratio ($P_{p1}/P_{p2}$) of the pump light strengths may be constant at each section and decrease in a stepwise manner, as shown in FIG. 6, for example. For example, as shown in FIG. 7, a section where the ratio ($P_{p1}/P_{p2}$) of pump light strengths changes continuously and a section with the constant ratio may be mixed.

Having described the example in which the linearity of the EDF amplification characteristic is used in consideration of the requirement for keeping the constant generated gains $G_1$ and $G_2$ in the EDFs, the requirement for keeping the constant generated gains $G_1$ and $G_2$ in the optical amplifying sections may be expressed mathematically by assuming the amplification characteristic of a different optical amplification medium from the one described above.

In addition, having described the example in which the ratio ($P_{p1}\backslash P_{p2}$) of pump light strengths is defined near the medium level within the permissible range of MPI-XT and NF deterioration (FIGS. 4 and 5), a higher ratio ($P_{p1}/P_{p2}$) of the pump light strengths in the range below the upper level of the MPI-XT permissible range is superior from the viewpoint of the suppression of NF deterioration since the suppression effect against the NF deterioration can be obtained by increasing the generated gain in the EDF 11 in the first stage.

Next, a second embodiment of the present invention will be described.

Figure 8:
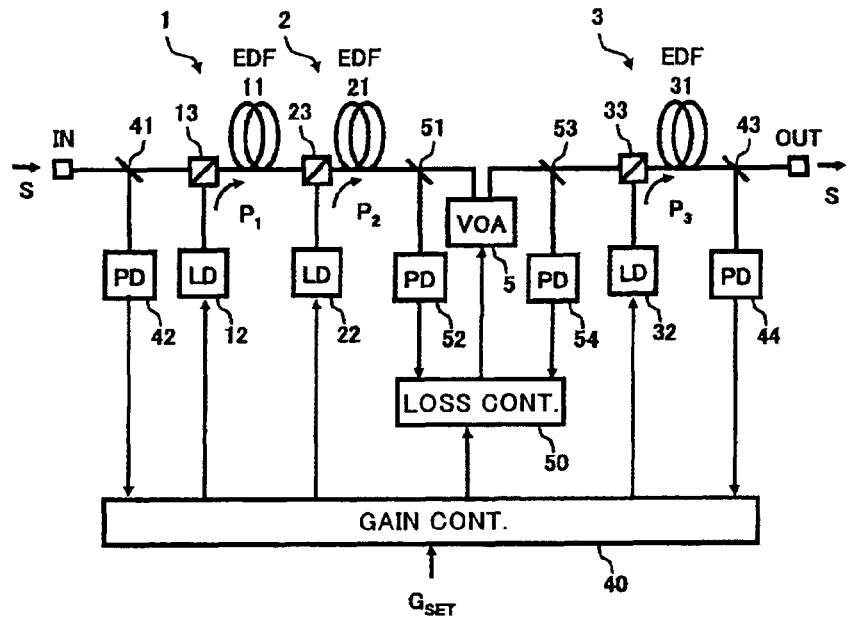
FIG. 8 is a block diagram showing the configuration of the optical amplifier according to a second embodiment of the present invention.

FIG. 8 is a block diagram showing a configuration of the optical amplifier according to a second embodiment of the present invention.

In FIG. 8, the optical amplifier of this embodiment may include optical amplifying sections 1, 2 and 3 in three stages, which are directly connected between an optical input port IN and an optical output port OUT, and a variable optical attenuator 5 on the optical path between the optical amplifying sections 2 and 3 in the second and third stages, for example. The configuration of this embodiment is different from the configuration in the first embodiment described above in that the optical amplifying section 3 in the third stage is added after the optical amplifying sections 1 and 2 of the first embodiment, and the position of the variable optical attenuator 5 is changed to the position between the optical amplifying sections 2 and 3 in the second and third stages. The other configuration is the same as that of the first embodiment. In FIG. 8, the illustration of the optical isolators 7 and gain equalizer 8 to be placed between the optical input port IN and the optical output port OUT in the configuration of the first embodiment is omitted.

The optical amplifying section 3 in the third stage has an EDF 31, an pump light source 32 and a WDM coupler 33, like the optical amplifying sections 1 and 2 in the first and second stages, and the pump light source 32 is controlled based on the control signal from a gain control section 40. Here, the strength of signal light S to be input to the EDF 31, the pump light to be output from the pump light source 32, the strength of the pump light and the generated gain in the EDF 31 are $P_{s3}$, $P_3$, $P_{p3}$, and $G_3$, respectively. Notably, the signal light s to be output from the optical amplifying section 3 in the third stage to the optical output port OUT is partially branched by an optical coupler 43 on the optical path between the EDF 31 and the optical output port OUT and is transmitted to a photodetector 44, and the signal light output strength $P_{SOUT}$ is monitored. The monitoring result by the photodetector 44 is transmitted to the gain control section 40 as in the first embodiment and is used for automatic gain control over the entire optical amplifier.

Also in the optical amplifier in the three-stage configuration as described above, the generated gains $G_1$, $G_2$ and $G_3$ in the EDFs 11, 21 and 31 can be kept constant independent of the change in gain set value $G_{SET}$, and the change in gain set value $G_{SET}$ can be compensated by changing the optical loss in the variable optical attenuator 5, like the first embodiment. When the generated gains $G_1$, $G_2$ and $G_3$ are kept constant in the EDFs 11, 21 and 31, the relationship among the signal light input strengths Ps1, Ps2 and Ps3 in the EDFs satisfies the relationship expressed by:

$$P_{s1}/P_{s3}=a_{13}/G_{SET} \quad [EQ9]; \text{ and}$$

$$P_{s2}/P_{s3}=a_{23}/G_{SET} \quad [EQ10]$$

where $a_{13}$ and $a_{23}$ are proportionality coefficients and fixed values.

In a case where the amplification characteristics of the EDFs 11, 21 and 31 have linearities as shown in FIG. 3 described above, the relationship among the signal light input strengths $P_{s1}$, $P_{s2}$ and $P_{s3}$ of the EDFs and the pump light strengths $P_{p1}$, $P_{p2}$ and $P_{p3}$ can be expressed by:

$$P_{p1}=a_1 \times P_{s1}+b_1 \quad [EQ11];$$

$$P_{p2}=a_2 \times P_{s2}+b_2 \quad [EQ12]; \text{ and}$$

$$P_{p3}=a_3 \times P_{s3}+b_3 \quad [EQ13]$$

where $a_1$ to $a_3$ and $b_1$ to $b_3$ are proportionality coefficients and fixed values.

Based on [EQ9] to [EQ13], the relationships among the pump light strengths $P_{p1}$, $P_{p2}$ and $P_{p3}$ of the EDFs can be expressed by:

$$(P_{p1}-b_1)/(P_{p3}-b_3)=c_{13}/G_{SET} \quad [EQ14]; \text{ and}$$

$$(P_{p2}-b_2)/(P_{p3}-b_3)=c_{23}/G_{SET} \quad [EQ15]$$

where $c_{13}=a_{13} \times a_1/a_3$ and $c_{23}=a_{23} \times a_2/a_3$ and $c_{13}$ and $2_{23}$ are fixed values.

Therefore, the ratio ($P_{p1}/P_{p3}$) of the pump light strengths of the EDFs in the first and third stages and the ratio ($P_{p2}/P_{p3}$) of the pump light strengths of the EDFs in the second and third stages, which correspond to the gain set value $G_{SET}$ for the entire optical amplifier, can be calculated based on the relationships in EQ4 and EQ5 by properly defining the constants $b_1$ to $b_3$, $c_{13}$ and $c_{23}$ in EQ14 and EQ15 in consideration of the permissible ranges of MPI-XT and NF deterioration based on the optical circuit configuration of the optical amplifier and the amplification characteristics of the EDFs. More specifically, the ratios ($P_{p1}/P_{p3}$) and ($P_{p2}/P_{p3}$) of the pump light strengths may be decreased as the gain set value $G_{SET}$ increases.

In this way, by performing automatic gain control over the entire amplifier by the gain control section 40 and the optical loss control section 50, as in the first embodiment as described above, based on the ratios ($P_{p1}/P_{p3}$) and ($P_{p2}/P_{p3}$) of the pump light strengths, which are optimized according to the gain set value $G_{SET}$, the generated gains $G_1$, $G_2$ and $G_3$ in the EDFs 11, 21 and 31 can be constant within the permissible ranges of MPI-XT and NF deterioration, independent of the change in gain set value $G_{SET}$.

Therefore, in the optical amplifier of the second embodiment, the automatic gain control can be quickly performed over the entire optical amplifier, keeping the generated gains $G_1$, $G_2$ and $G_3$ in the EDFs 11, 21 and 31 within a proper range even when the gain set value $G_{SET}$ changes, and the adverse effect to the optical transmission characteristic due to MPI-XT and/or NF deterioration can be avoided.

Next, a third embodiment of the present invention will be described.

Figure 9:
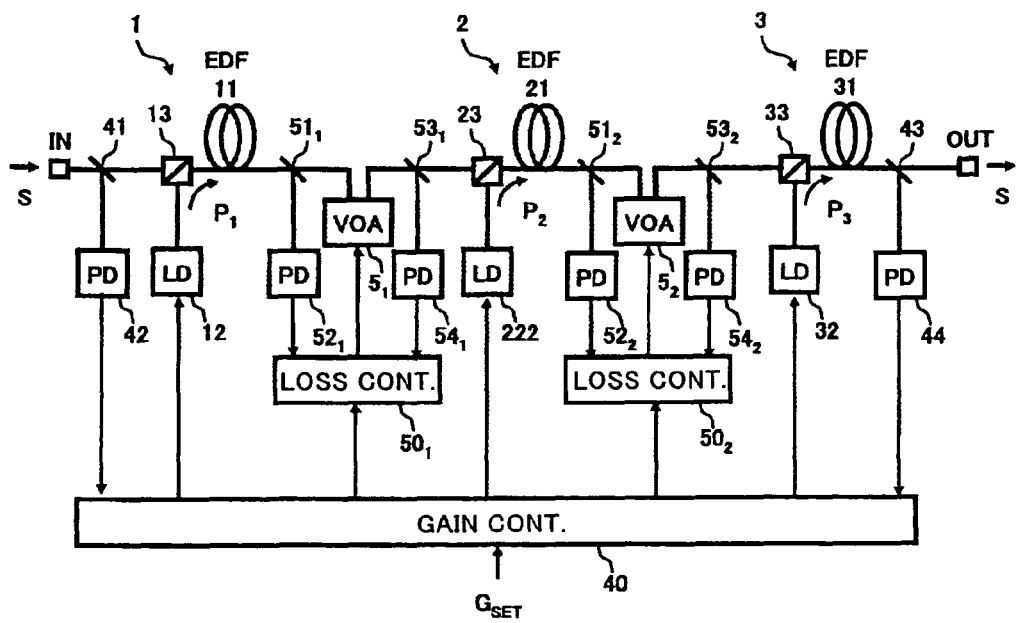
FIG. 9 is a block diagram showing the configuration of the optical amplifier according to a third embodiment of the present invention.

FIG. 9 is a block diagram showing a configuration of the optical amplifier according to the third embodiment of the present invention.

In FIG. 9, the optical amplifier of this embodiment further includes a variable optical attenuator between the optical amplifying sections 1 and 2 in the first and second stages in the configuration of the second embodiment shown in FIG. 8. Here, a variable optical attenuator $5_1$ and an optical loss control section $50_1$ that controls it are provided between the optical amplifying sections 1 and 2 in the first and second stages, and a variable optical attenuator $5_2$ and an optical loss control section $50_2$ that controls it are provided between the optical amplifying sections 2 and 3 in the second and third stages. Notably, the variable optical attenuators $5_1$ and $5_2$ and optical loss control sections $50_1$ and $50_2$ are the same as the variable optical attenuator 5 and the optical loss control section 50 in the first embodiment.

Figure 10:
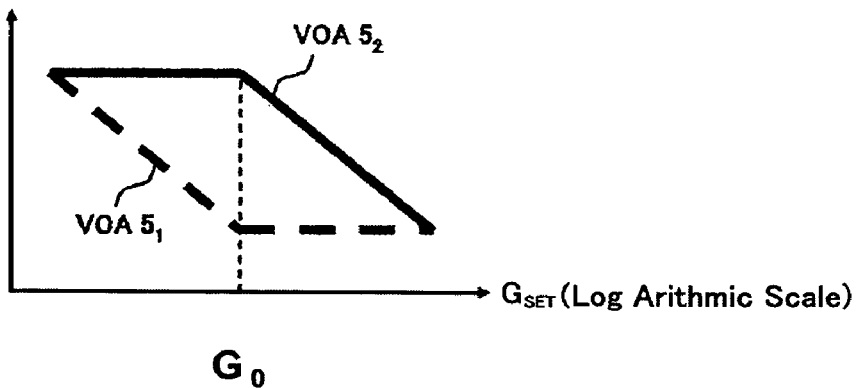
FIG. 10 is a diagram showing an example of the relationship of the optical loss of each variable optical attenuator against a gain set value according to the third embodiment.

In the optical amplifier having the configuration above, the change in gain set value $G_{SET}$ in the entire optical amplifier is compensated by controlling the optical losses in the two variable optical attenuators $5_1$ and $5_2$. The relationship of the optical losses in the variable optical attenuators $5_1$ and $5_2$ against the gain set value $G_{SET}$ according to the height of the gain set value $G_{SET}$ about a predetermined reference value $G_0$, as shown in FIG. 10, can be defined as that:

(i) In a case where the gain set value $G_{SET}$ is equal to or lower than the reference value $G_0$ ($G_{SET} \leq G_0$), the change in gain set value $G_{SET}$ is compensated by controlling the optical loss in the variable optical attenuator $5_1$ in the first stage, and the optical loss in the variable optical attenuator $5_2$ in the second stage is kept constant.

(ii) In a case where the gain set value $G_{SET}$ is higher than the reference value $G_0$ ($G_{SET} > G_0$), the change in gain set value $G_{SET}$ is compensated by controlling the optical loss in the variable optical attenuator $5_2$ in the second stage, and the optical loss in the variable optical attenuator $5_1$ in the first stage is kept constant.

In the case (ii), the automatic gain control over the optical amplifier including the control over the variable optical attenuator $5_2$ in the second stage is the same as the case of the second embodiment since the optical loss in the variable optical attenuator $5_1$ in the first stage is fixed.

In the case (i) on the other hand, the relationships to be satisfied among the signal light input strengths $P_{s1}$, $P_{s2}$ and $P_{s3}$ of the EDFs when the generated gains $G_1$, $G_2$ and $G_3$ of the EDFs 11, 21 and 31 are kept constant are:

$$P_{s1}/P_{s2} = a_{12}/G_{SET} \quad \text{[EQ16]; and}$$

$$P_{s1}/P_{s3} = a_{13}/G_{SET} \quad \text{[EQ17]}$$

where $a_{12}$ and $a_{13}$ are proportionality coefficients and fixed values.

In a case where the amplification characteristics of the EDFs 11, 21 and 31 have linearities as shown in FIG. 3 described above, the pump light strengths $P_{p1}$, $P_{p2}$ and $P_{p3}$ of the EDFs can have the same relationships as in EQ11 to EQ13. Therefore, based on EQ16 to EQ17 and EQ11 to EQ13, the relationships among the pump light strengths $P_{p1}$, $P_{p2}$ and $P_{p3}$ of the EDFs can be expressed by:

$$(P_{p1}-b_1)/(P_{p2}-b_2) = c_{12}/G_{SET} \quad \text{[EQ18]; and}$$

$$(P_{p1}-b_1)/(P_{p3}-b_3) = c_{13}/G_{SET} \quad \text{[EQ19]}$$

where $c_{12} = a_{12} \times a_1/a_2$ and $c_{13} = a_{13} \times a_1/a_3$, and $c_{12}$ and $c_{13}$ are fixed values.

Therefore, also in the case (i) where $G_{SET} > G_0$, the ratio ($P_{p1}/P_{p2}$) of the pump light strengths of the EDFs in the first and second stages and the ratio ($P_{p1}/P_{p3}$) of the pump light strengths of the EDFs in the first and third stages, which correspond to the gain set value $G_{SET}$ for the entire optical amplifier, can be calculated based on the relationships in EQ18 and EQ19 by properly defining the constants $b_1$ to $b_3$, $c_{12}$ and $c_{13}$ in EQ18 and EQ19 in consideration of the permissible ranges of MPI-XT and NF deterioration based on the optical circuit configuration of the optical amplifier and the amplification characteristics of the EDFs. More specifically, the ratios ($P_{p1}/P_{p2}$) and ($P_{p1}/P_{p3}$) of the pump light strengths may be decreased as the gain set value $G_{SET}$ increases.

Figure 11:
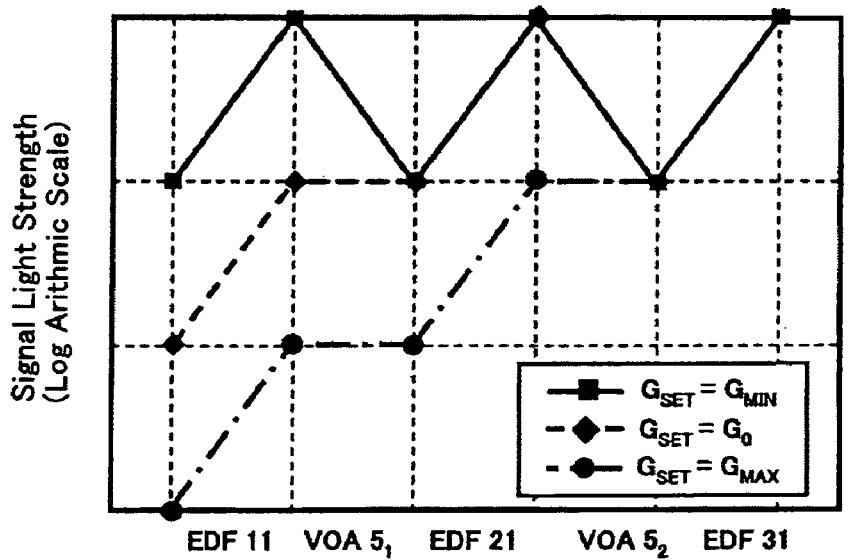
FIG. 11 is a diagram showing an example of the level diagram corresponding to different gain set values according to the first embodiment.
Figure 12:
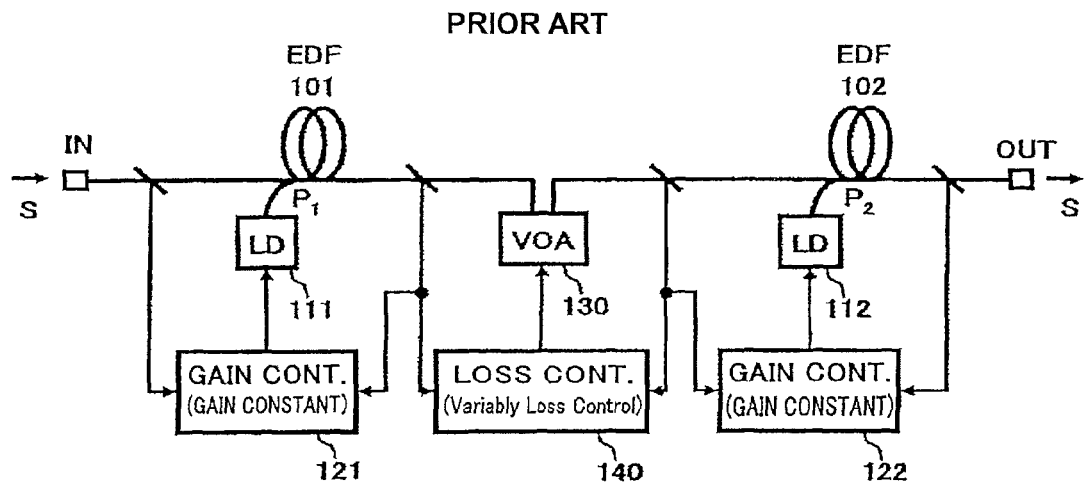
FIG. 12 is a block diagram showing a configuration example of a conventional optical amplifier.
Figure 13:
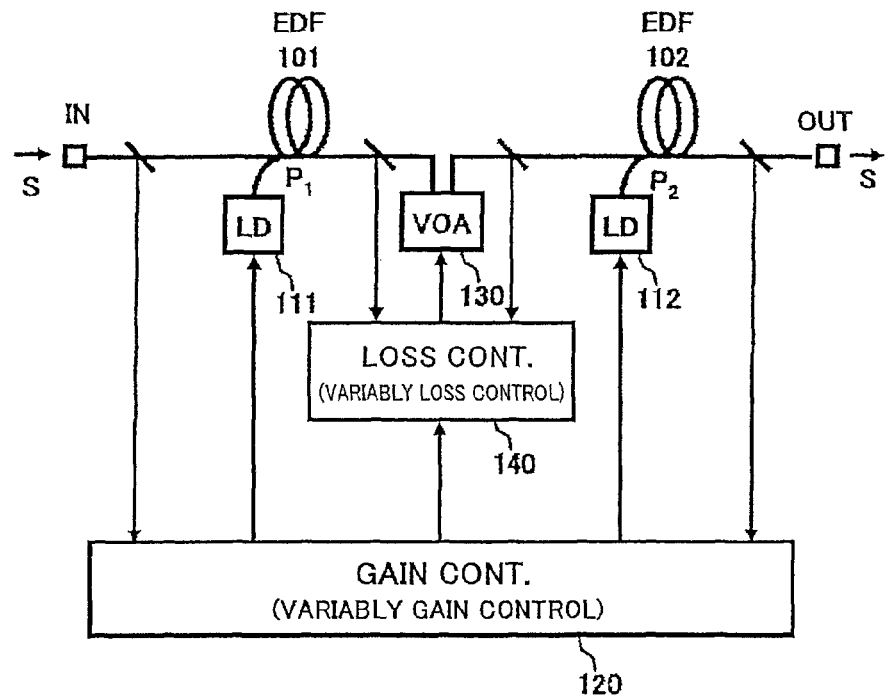
FIG. 13 is a block diagram showing an advantageous configuration example for increasing the speed of automatic gain control.
Figure 14:
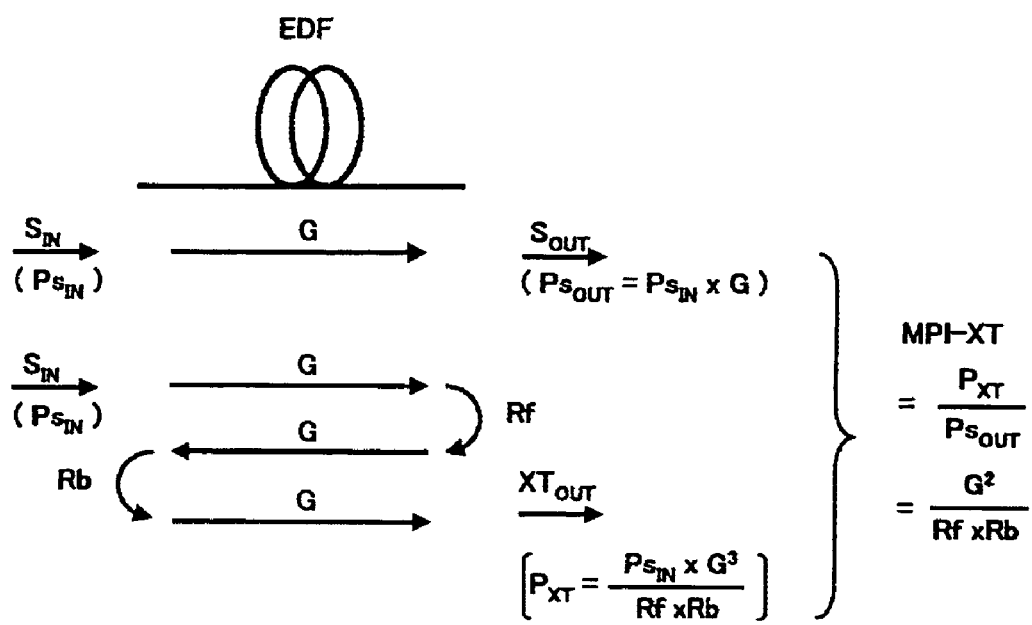
FIG. 14 is a diagram for explaining MPI-XT in an optical amplifier.
Figure 15:
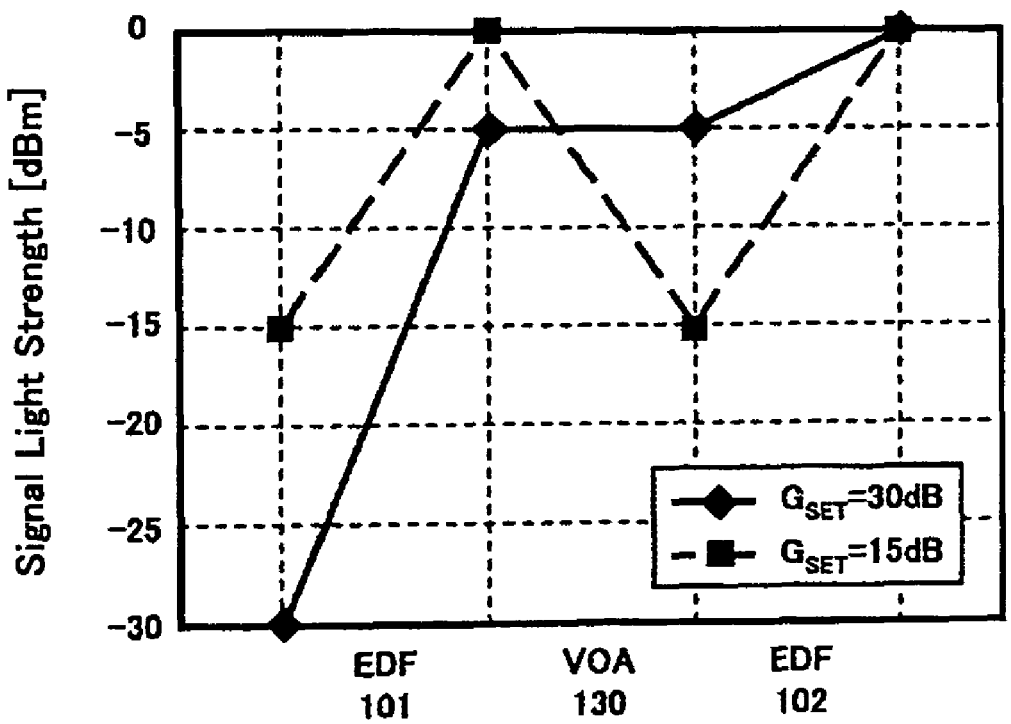
FIG. 15 is a diagram showing an example in a case where the ratio of pump light strengths of EDFs in the configuration in FIG. 13 is set higher.
Figure 16:
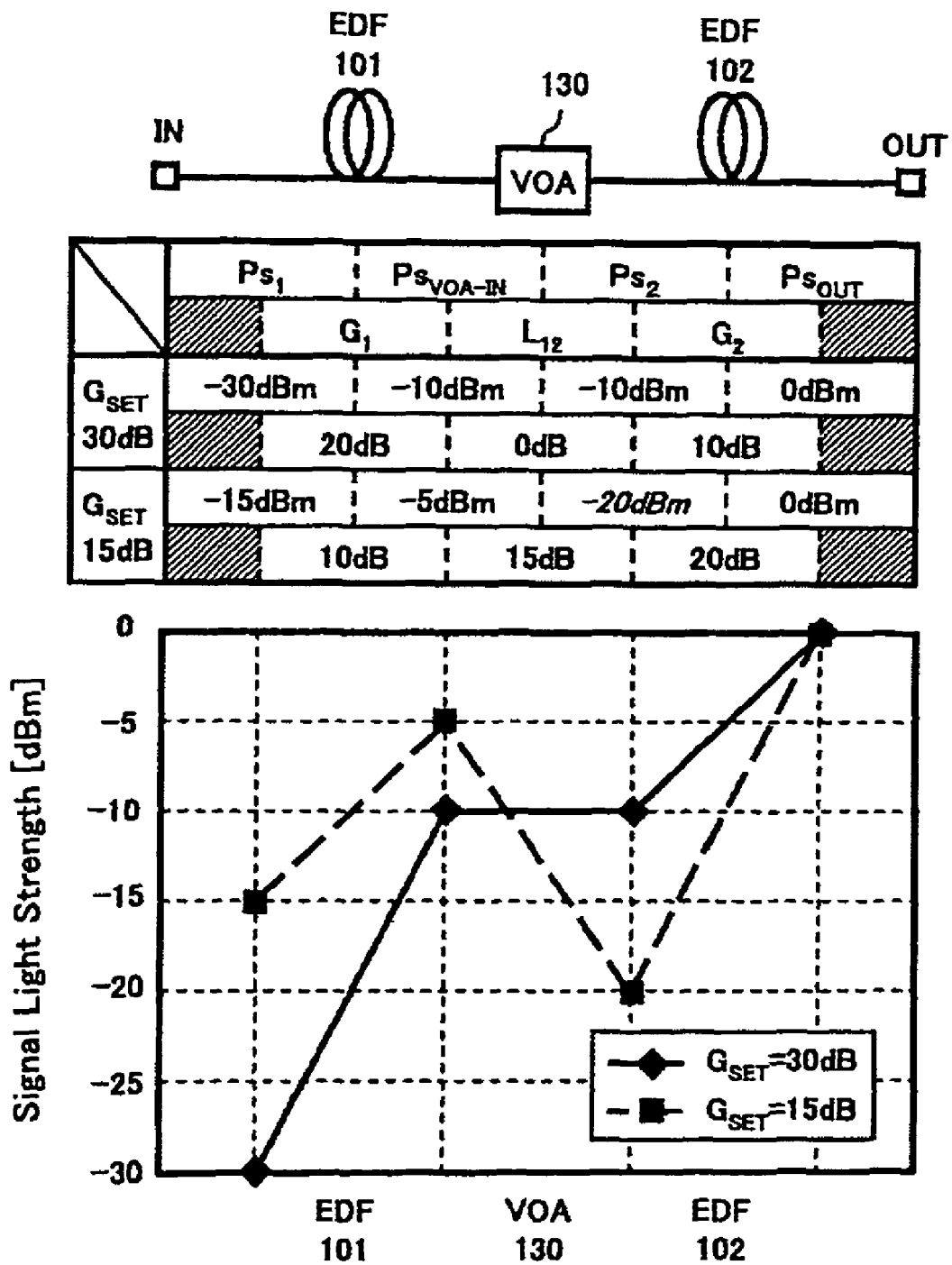
FIG. 16 is a diagram showing an example in a case where the ratio of pump light strengths of EDFs in the configuration in FIG. 13 is set lower.
Figure 17:
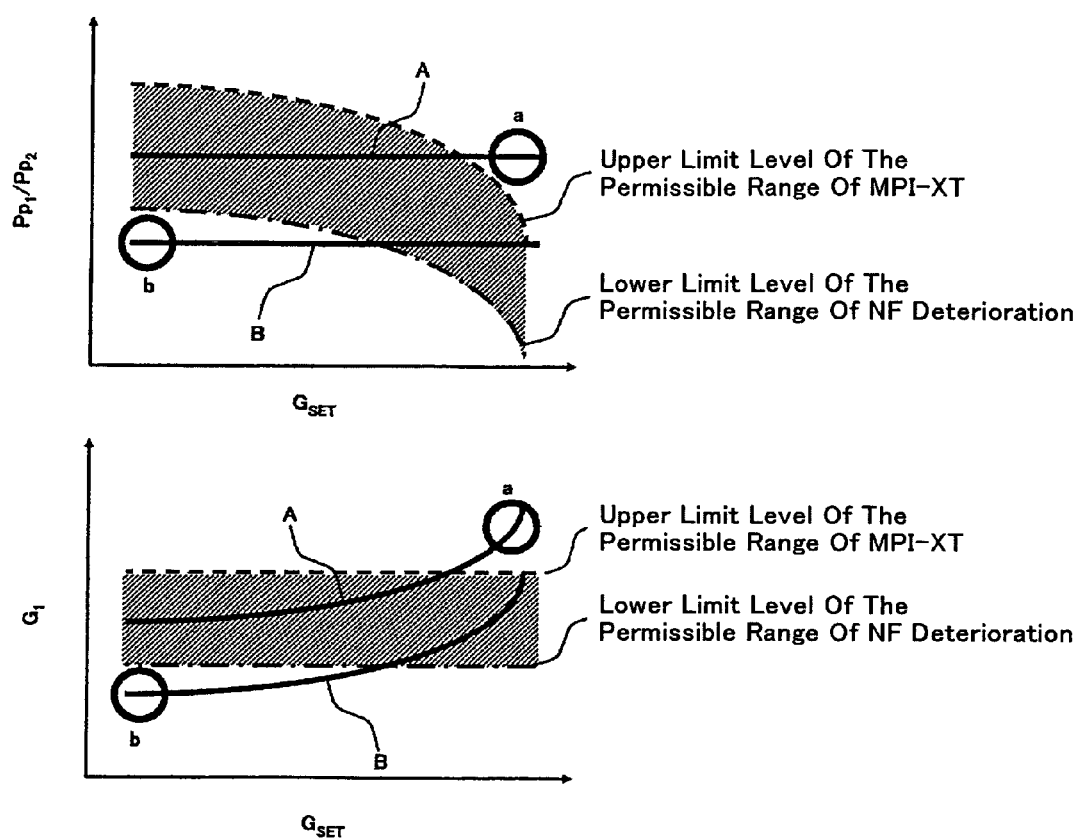
FIG. 17 is a diagram showing the stages of MPI-XT and NF deterioration caused by the change in gain set value in the configuration in FIG. 13.

In this way, by switching the variable optical attenuators $5_1$ and $5_2$, which compensate the change in gain set value $G_{SET}$ according to the height of the gain set value $G_{SET}$ about the reference value $G_0$, and performing automatic gain control over the entire optical amplifier by the gain control section 40 and the optical loss control sections $50_1$ and $50_2$, as in the first embodiment as described above, based on the ratios ($P_{p1}/P_{p3}$) and ($P_{p2}/P_{p3}$) or ($P_{p1}/P_{p2}$) and ($P_{p1}/P_{p3}$) of the pump light strengths, which are optimized according to the gain set value $G_{SET}$, the generated gains $G_1$, $G_2$ and $G_3$ in the EDFs 11, 21 and 31 can be constant within the permissible ranges of MPI-XT and NF deterioration, independent of the change in gain set value $G_{SET}$. FIG. 11 shows an example of the level diagram in the optical amplifier of the third embodiment.

Therefore, also by applying the configuration as in the third embodiment, the automatic gain control can be quickly performed over the entire optical amplifier, keeping the generated gains $G_1$, $G_2$ and $G_3$ in the EDFs 11, 21 and 31 within a proper range, and the adverse effect to the optical transmission characteristic due to MPI-XT and/or NF deterioration can be avoided.

Having described the first to third embodiments in which the optical amplifier includes optical amplifying sections in two or three stages, the present invention is also applicable to a case where optical amplifying sections in four or more stages are provided in the same manner as those of the embodiments.

The optical amplifier in the configuration above described embodiments optimizes the ratio of the pump light strength of the optical amplifying section in the first stage and the pump light strength of the optical amplifying sections in the second and subsequent stages according to the gain set value, and performs the automatic gain control over the entire optical amplifier quickly.

Therefore, the generated gains in the optical amplifying sections can be kept in a proper range even when the gain set value is changed, and the adverse effect on the optical transmission characteristic due to MPI-XT and/or NF deterioration can be avoided.

The invention claimed is:

1. An optical amplifier, comprising:
an input port inputting signal light;
an output port outputting the signal light;
a plurality of amplifying parts including an optical amplification medium amplifying the signal light and a pumping light source generating pump light for pumping the optical amplification medium, respectively, the amplifying parts serially connected to each other between the input port and the output port, the plurality of amplifying parts including a first amplifying part which is arranged by the input port and another amplifying parts, the plurality of amplifying parts having a ratio of the pump light power of the first amplifying part to the pump light power of the another amplifying parts;
an optical attenuator optically connected between the amplifying parts, the optical attenuator variably attenuating the signal light from upstream of the optical amplifier;
a gain controller controlling pump light power of each pump source of the amplifying parts in order to maintain a sum of generating gains of the amplifying parts; and
an optical attenuator controller controlling attenuation of the optical attenuator in order to maintain the sum of generating gains of the amplifying parts at a gain set value instructed externally in accordance with a state of the signal light inputted into the input port;
wherein the gain controller determines an upper level of a multi pass interference (MPI) between the input port and the output port and a lower level of a noise figure (NF) of deterioration of each of the amplifying parts by amplifying characteristics of the optical amplifier, and controls the pump light power of the pump sources, respectively, in such a way that the ratio decreases in accordance with the gain set value increasing and the ratio has a value between the upper level and the lower level.

2. The optical amplifier of claim 1:
wherein the gain controller controls each of the pump light power of the amplifier parts for maintaining each generating gains of the amplifier parts; and
wherein the optical attenuator controller controls attenuation of the optical attenuator for compensating a change of the gain set value.

3. The optical amplifier of claim 1, wherein the gain controller controls each of the pump light power of the amplifier parts for continually declining the ratio in accordance with increase of the gain set value increases.

4. The optical amplifier of claim 1, wherein the gain controller controls each of the pump light power of the amplifier parts for gradually declining the ratio in accordance with increase of the gain set value increases.

5. The optical amplifier of claim 1, wherein the gain controller controls at least one of the pump light power of the amplifier parts for continually declining the ratio in accordance with increase of the gain set value increases and the gain controller controls the another pump light power of the amplifier parts for maintaining the ratio.

6. The optical amplifier of claim 1, wherein the optical amplification medium is an erbium doped fiber.

7. The optical amplifier of claim 1, wherein the optical amplification medium is an erbium doped fiber having a linearity amplifying characteristics in relationships between a power of the inputting signal light, the pump light power and the generating gains.

* * * * *